United States Patent
Ma et al.

(10) Patent No.: US 12,086,358 B1
(45) Date of Patent: Sep. 10, 2024

(54) TOUCH STATUS MONITOR IN LOW POWER MODE

(71) Applicant: STMicroelectronics International N.V., Geneva (CH)

(72) Inventors: Qiang Ma, Shenzhen (CN); Yuan Yun Wang, New Taipei (TW)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/500,782

(22) Filed: Nov. 2, 2023

(51) Int. Cl.
*G06F 3/041* (2006.01)
*G06F 3/044* (2006.01)

(52) U.S. Cl.
CPC .... *G06F 3/041662* (2019.05); *G06F 3/04186* (2019.05); *G06F 3/0443* (2019.05); *G06F 3/0446* (2019.05); *G06F 2203/04106* (2013.01)

(58) Field of Classification Search
CPC ............... G06F 3/04883; G06F 3/0488; G06F 3/04845; G06F 3/04817; G06F 3/04842; G06F 3/0483; G06F 3/0446; G06F 3/0485; G06F 3/04166; G06F 3/0416; G06F 3/044; G06F 3/03545; G06F 3/0346; G06F 3/0383; G06F 3/0418; G06F 3/0443; G06F 3/038; G06F 3/04847; G06F 3/0414; G06F 3/0445; G06F 2203/04808; G06F 2203/04104; G06F 1/1626; G06F 1/3203; G06F 1/3262; G06F 1/3231; G06F 1/3296; G06F 1/3265; G06F 1/3259; G06F 1/3287; G06F 9/451
See application file for complete search history.

(56) References Cited

U.S. PATENT DOCUMENTS

| | | | |
|---|---|---|---|
| 2013/0265276 A1 | 10/2013 | Obeidat et al. | |
| 2015/0234446 A1 | 8/2015 | Nathan et al. | |
| 2015/0253890 A1 | 9/2015 | Sobel et al. | |
| 2016/0291792 A1* | 10/2016 | Sawahata | G06F 3/0418 |
| 2018/0188846 A1* | 7/2018 | Srivastava | G06F 3/0412 |
| 2022/0137693 A1 | 5/2022 | Syed et al. | |

* cited by examiner

*Primary Examiner* — Dong Hui Liang
(74) *Attorney, Agent, or Firm* — Slater Matsil, LLP (57) ABSTRACT

A touch status monitor method includes detecting a touch on a touch screen when operating in a low-power detect scan mode. The method further includes, in response to detecting the touch, switching from the low-power detect scan mode to a low-power active scan mode and labeling the current event as a touch down event. The method further includes, in response to labeling the current event as the touch down event, applying a lock to prevent updating a baseline when entering the low-power detect scan mode. And the method further includes, in response to detecting that the touch has left the touch screen, releasing the lock, labeling the current event as a touch up event, switching from the low-power active scan mode to the low-power detect scan mode, and updating the baseline.

20 Claims, 6 Drawing Sheets

TOUCH STATUS MONITOR IN LOW POWER MODE

TECHNICAL FIELD

The present invention relates to the field of computer interaction, specifically to a touch status monitor in low-power mode.

BACKGROUND

Electronic devices, such as smartphones, tablets, and other portable devices, commonly employ touch screens as their primary input mechanism. Touch screens enable users to interact with the devices through intuitive gestures and touches, enhancing the overall user experience. However, touch screens are notorious for their power consumption, which can significantly impact the operational lifetime of battery-powered electronic devices.

To address this issue, electronic devices often incorporate power-saving mechanisms, such as low-power modes, to extend battery life. In a low-power mode, various components of the device are selectively turned off or put into a sleep state to minimize power consumption. While this approach helps conserve energy, it also presents challenges in maintaining touch screen functionality without consuming excessive power.

Conventional touch screen technologies require continuous monitoring of touch events even when the device is in a low-power mode. This necessitates maintaining a certain level of power to the touch screen controller and associated components, leading to power wastage and ultimately reducing the effectiveness of the low-power mode.

Moreover, traditional touch screen systems lack the ability to intelligently differentiate between intentional touch inputs and unintended or accidental touches during low-power mode operation. As a result, the devices often wake up from their low-power state unnecessarily, leading to additional power consumption and diminishing the overall power-saving benefits.

There is, therefore, a need for an improved touch status monitor system that can efficiently detect and differentiate touch inputs during low-power mode operation, while effectively managing power consumption to prolong the device's battery life.

SUMMARY

In accordance with an embodiment of the present invention, a touch status monitor method includes detecting a touch on a touch screen when operating in a low-power detect scan mode. The method further includes, in response to detecting the touch, switching from the low-power detect scan mode to a low-power active scan mode and labeling the current event as a touch down event. The method further includes, in response to labeling the current event as the touch down event, applying a lock to prevent updating a baseline when entering the low-power detect scan mode. And the method further includes, in response to detecting that the touch has left the touch screen, releasing the lock, labeling the current event as a touch up event, switching from the low-power active scan mode to the low-power detect scan mode, and updating the baseline.

An electronic device includes a touch screen, an application processor, and a touch controller coupled to a memory storing instructions to be executed in the touch controller. The instructions when executed cause the touch controller to detect a touch on the touch screen when operating in a low-power detect scan mode, and in response to detecting the touch, switch from the low-power detect scan mode to a low-power active scan mode and label the current event as a touch down event. The instructions when executed cause the touch controller to, in response to labeling the current event as the touch down event, apply a lock to prevent updating a baseline when entering the low-power detect scan mode, and in response to detecting that the touch has left the touch screen, release the lock, label the current event as a touch up event, switch from the low-power active scan mode to the low-power detect scan mode, and update the baseline.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Touch screens have revolutionized the way users interact with electronic devices, providing a more intuitive and user-friendly input method. These touch screens rely on touch status monitors to accurately detect and interpret user touch events, enabling precise control and navigation within graphical user interfaces (GUIs). However, one significant drawback associated with touch status monitors is their high power consumption, which can adversely affect the battery life of portable electronic devices.

Conventional touch status monitors operate in a high-power mode, constantly sampling touch events and updating the display in real-time. This continuous power-intensive operation contributes to increased power consumption, limiting the overall usage time of battery-powered devices. As a result, users often face the inconvenience of frequent recharging or being constrained by limited battery life.

Efforts have been made to reduce power consumption in touch status monitors. One common approach is to employ power management techniques, such as using a touch status monitor in low-power mode, reducing the display refresh rate, or adjusting the backlight intensity, to conserve power. However, these methods often compromise the accuracy and responsiveness of touch detection, leading to a suboptimal user experience.

Conventional touch screen technologies require continuous monitoring of touch events even when the device is in a low-power mode. This necessitates maintaining a certain level of power to the touch screen controller and associated components, leading to power wastage and ultimately reducing the effectiveness of the low-power mode.

Moreover, traditional touch screen systems lack the ability to intelligently differentiate between intentional touch inputs and unintended or accidental touches during low-power mode operation. As a result, the devices often wake up from their low-power state unnecessarily, leading to additional power consumption and diminishing the overall power-saving benefits.

Therefore, there is a need for an improved touch status monitor in low-power mode that can effectively conserve power without compromising the accuracy of touch detection and feedback, and can effectively prevent waking an electronic device from a low-power mode by unintentional touch events. Such a system would enable electronic devices to conserve more power to operate for extended periods of time, enhancing user convenience and mobility.

Figure 1:
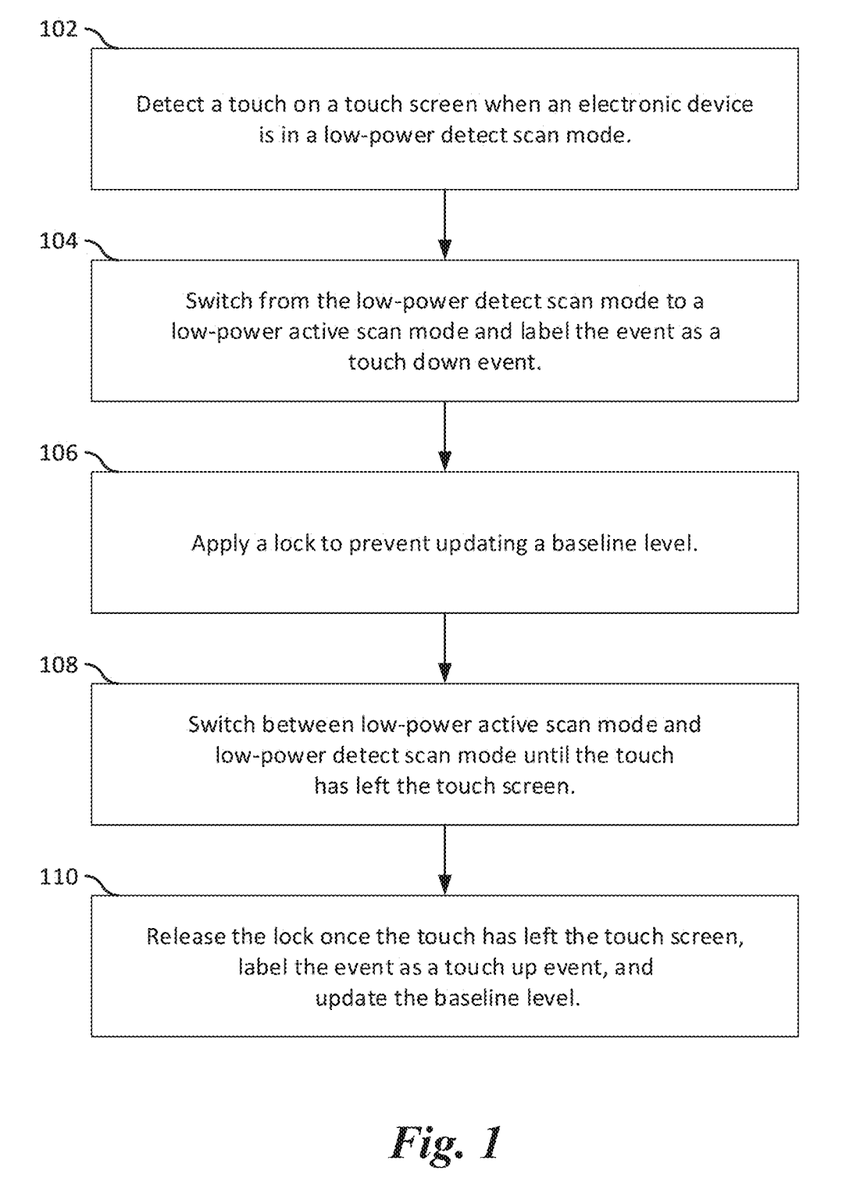
FIG. 1 illustrates a flowchart of a touch status monitor of a touch screen in low-power mode.
Figure 2:
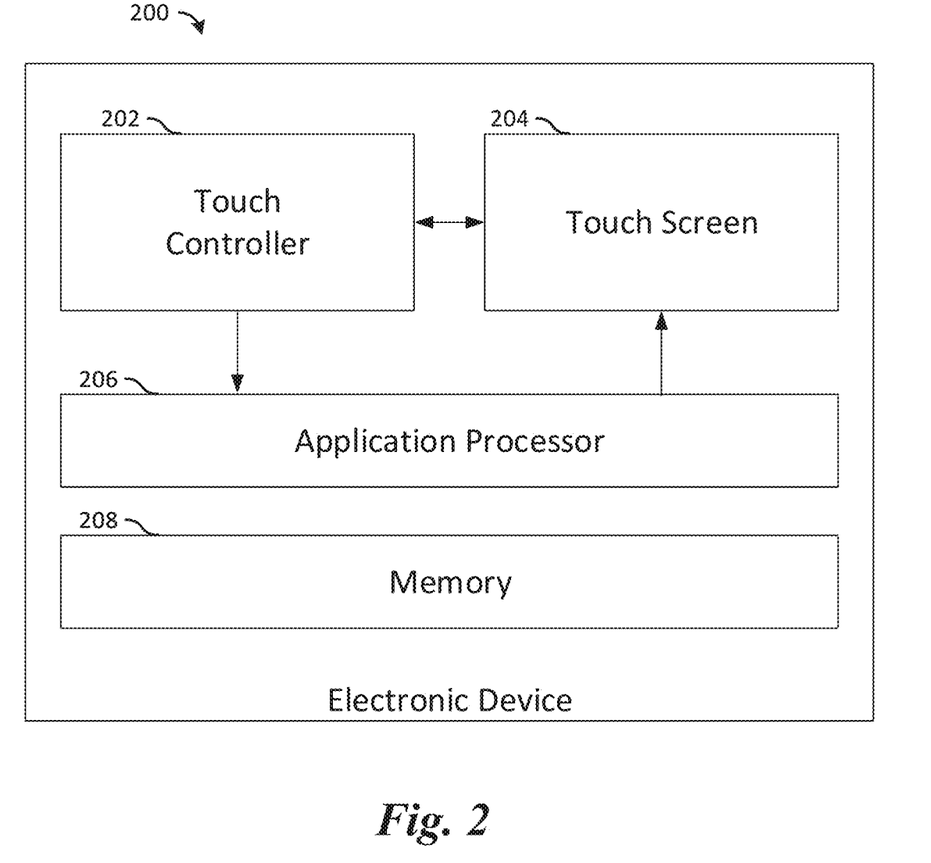
FIG. 2 illustrates a system diagram of an electronic device with a touch screen in an embodiment.
Figure 3:
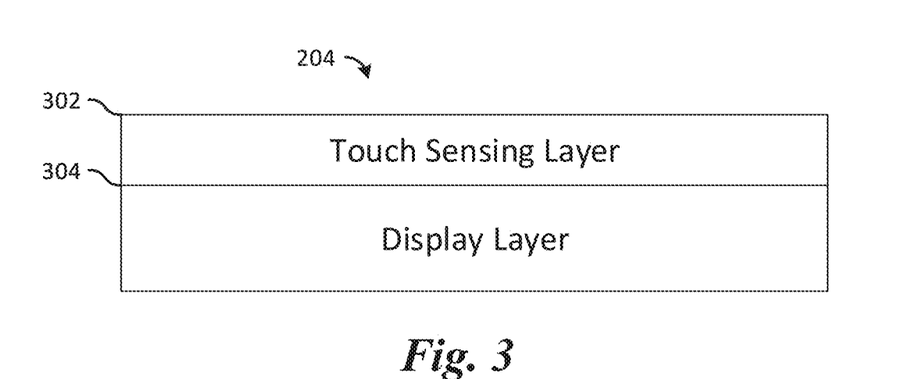
FIG. 3 illustrates a diagram of comprising layers of a touch screen in an embodiment.
Figure 4:
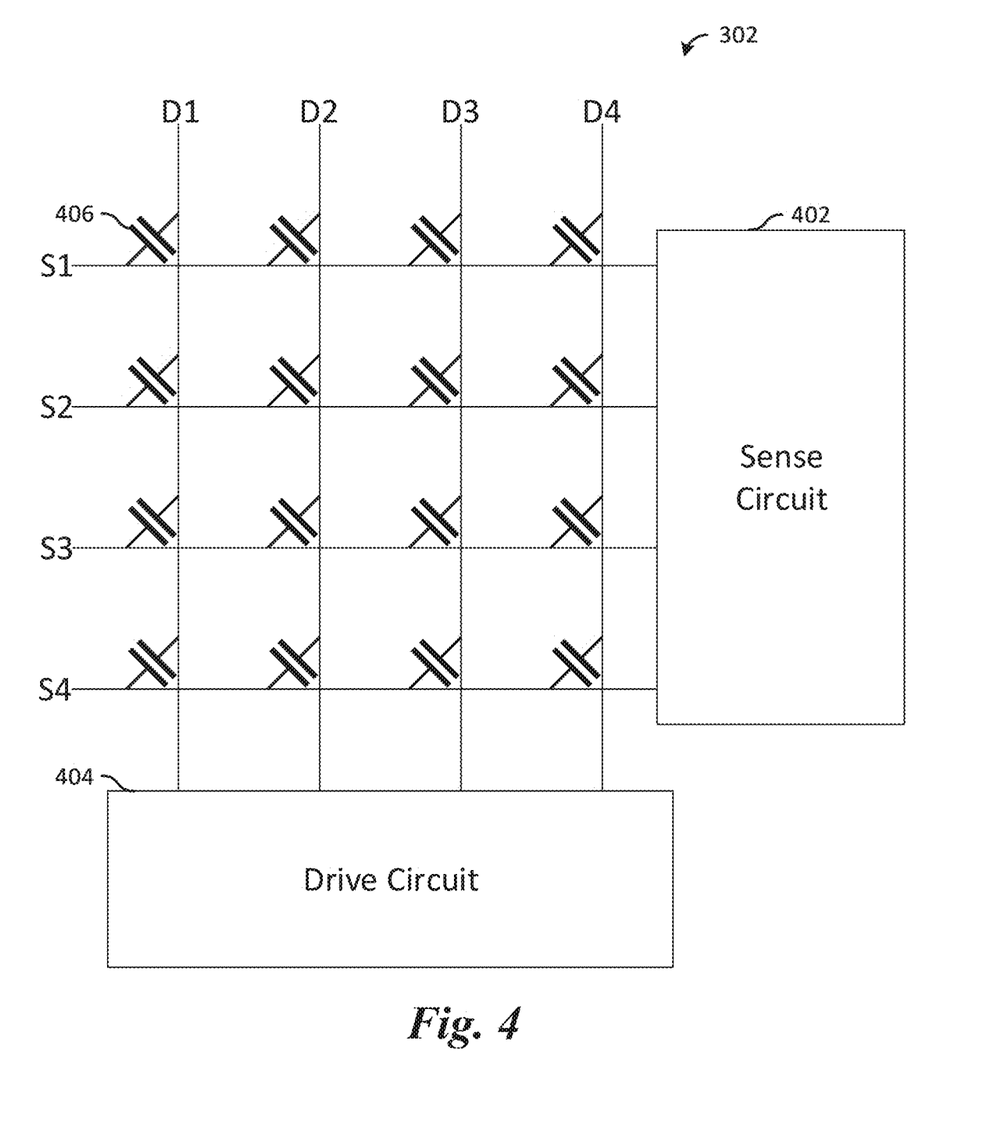
FIG. 4 illustrates a diagram of a capacitive touch sensing layer in an embodiment.
Figure 5:
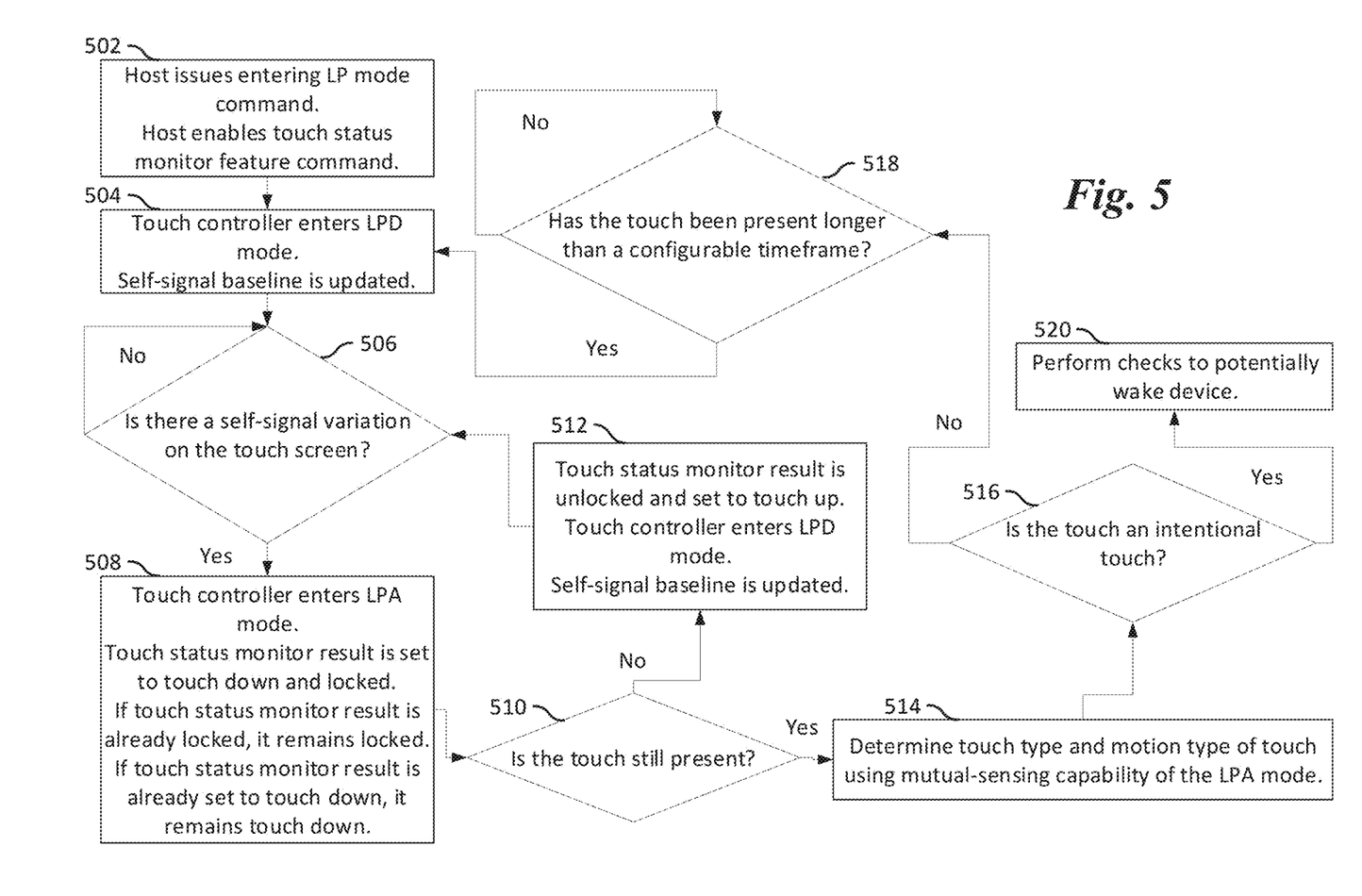
FIG. 5 illustrates a flowchart of a touch status monitor of a touch screen in low-power mode in an embodiment.
Figure 6:
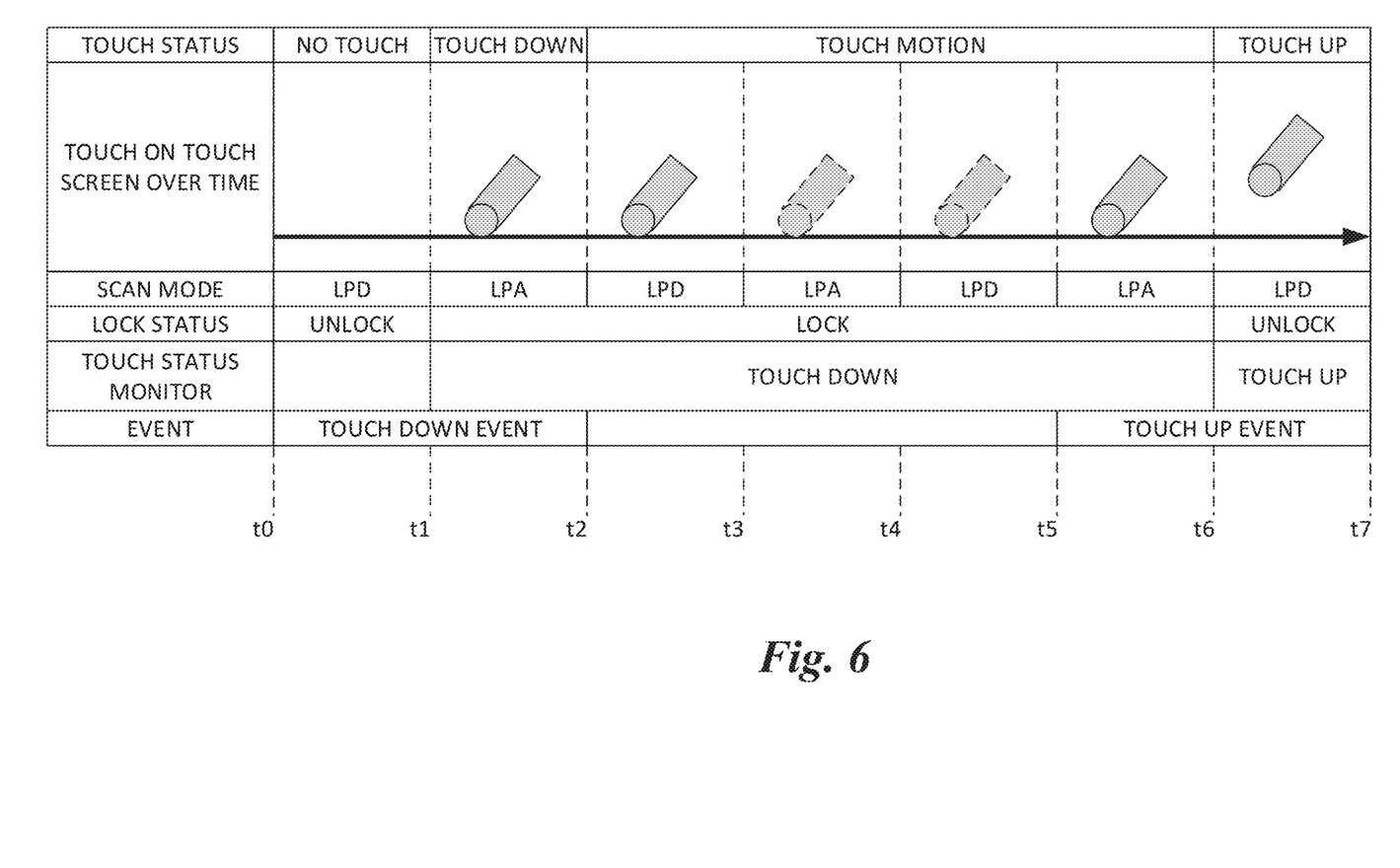
FIG. 6 illustrates a table of status monitors that may be used in a touch status monitor in low-power mode in an embodiment.
Figure 7:
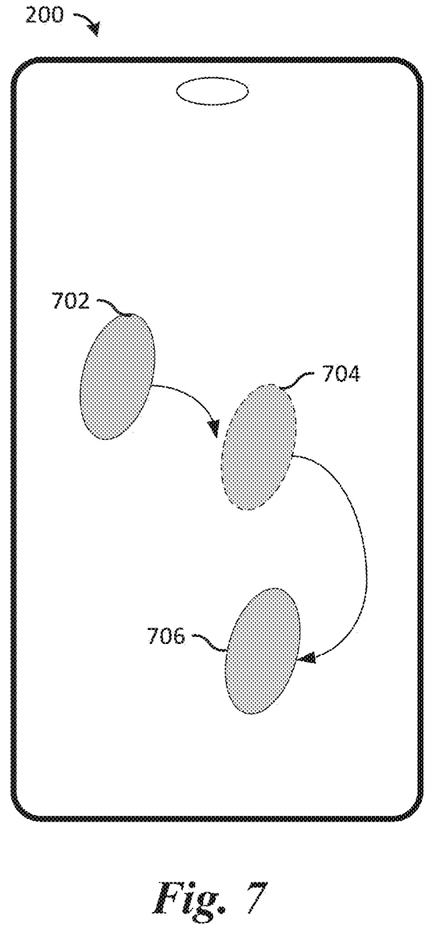
FIG. 7 illustrates an example touch event on an electronic device with a touch screen called continuous touch in an embodiment.
Figure 8:
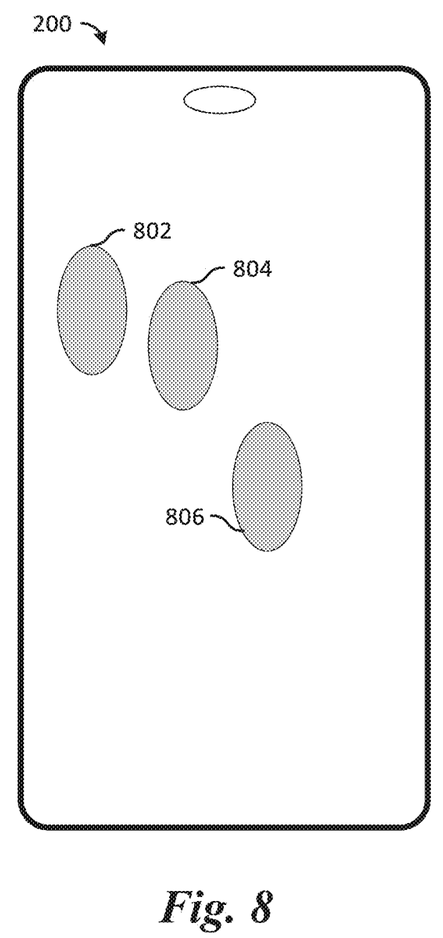
FIG. 8 illustrates an example touch event on an electronic device with a touch screen called multi-finger touch in an embodiment.

This disclosure details a touch status monitor in low-power mode that may prevent an electronic device from waking from a low-power mode by unintentional touches from a user, or other external object. FIG. 1 illustrates a flowchart of the touch status monitor in low-power mode of this disclosure. FIGS. 2-4 illustrate system diagrams of the components of an electronic device with a touch screen that may implement the touch status monitor in low-power mode of this disclosure. FIG. 5 is a flowchart of another implementation of the touch status monitor in low-power mode of this disclosure. An example touch event is illustrated in the table of FIG. 6, and the results of the touch status monitor are discussed for the example touch event. Two other touch event examples are illustrated in FIGS. 7-8, and how they are addressed by the touch status monitor in low-power mode of this disclosure are discussed.

FIG. 1 illustrates a flowchart of a touch status monitor in low-power mode that may be implemented on an electronic device with a touch screen. The touch status monitor in low-power mode may be a feature implemented by the touch controller of an electronic device with a touch screen to monitor, detect, and subsequently determine whether a touch event intends to bring the electronic device out of a sleep mode, or low-power mode. The touch status monitor in low-power mode of this disclosure may be a firmware feature implemented by the touch controller when the electronic device operates in a low-power mode.

The touch status monitor in low-power mode may be implemented by a touch controller of an electronic device once the electronic device enters low-power mode. The touch status monitor, in box 102, detects a touch on a touch screen of an electronic device in low-power mode, and actively scans the touch screen using a low-power detect (LPD) scan mode. The LPD scan mode comprises a scan mode that scans the touch screen for a variation in a quantity (such as self-capacitance, for the case of a capacitive touch screen) for the entire touch screen surface without measuring precision details of a grid of touch sensors. As a result, the LPD scan mode has low resolution, but consumes less power than an active scan mode that monitors the entire grid of touch sensors of a touch screen. The LPD scan mode may determine a set of touch down event information, such as a touch down event label, and a touch down time. In an embodiment, the touch down event label may be a number that uniquely identifies the touch event and the touch down time may be the time that the touch event was first detected.

The advantages of the touch status monitor in low-power mode of this disclosure include increased power conservation. By monitoring the touch screen using the LPD scan mode for the majority of the time, the electronic device operates in the low-power mode, and thereby power consumption of the touch screen may be reduced.

After detecting a touch event on the touch screen, the monitor proceeds to box 104. In box 104, the touch status monitor in low-power mode switches the scan mode of the touch controller of the touch screen from LPD to a low-power active (LPA) scan mode. The LPA scan mode comprises a mutual-sensing scan mode that has a higher resolution than the LPD scan mode. The LPA scan mode may be more power intensive than the LPD scan mode, but determines more useful information about the touch event, such as a touch up event label, a touch up time, the touch coordinates, touch type, and motion type of the touch event. After the scan mode switches to LPA scan mode, the touch status monitor labels the touch event to be a touch down event. In an embodiment, the touch up event label may be a unique number that is the same number as the touch down event label that corresponds to the same touch event, and the touch up time is the time that the touch event was detected to leave the touch screen.

After the scan mode switches to LPA scan mode and after labeling the touch event as a touch down event, the monitor proceeds to box 1o6. In box 1o6, the touch status monitor in low-power mode applies a lock on the self-signal baseline of the LPD scan mode. In an embodiment, the lock may be a software lock that prevents the self-signal baseline from updating. The lock prevents the touch status monitor from unnecessarily switching between LPD and LPA scan modes by preventing the self-signal baseline from updating. Certain types of touches cause current touch status monitors to needlessly switch between the two scan modes. This results in extraneous power consumption and reduces the efficiency of current touch status monitors. The touch status monitor in low-power mode of this disclosure addresses this problem by using the lock.

When the LPA scan mode has completed a scan of the touch screen to determine the touch information of the touch event and applied the lock to the self-signal baseline, the monitor proceeds to box 1o8. In box 1o8, the touch status monitor in low-power mode switches the scan mode employed by the touch controller from the LPA scan mode back to the LPD scan mode and stores the touch information of the touch event determined by the LPA scan mode. The touch controller may determine, based on the touch information from the LPA scan mode, whether the touch event intended to wake the electronic device from the low-power mode. If the touch controller determines that the touch event intended to wake the electronic device, the most recent mutual-sensing touch information from the LPA scan mode will be communicated to the host as a touch up event and the self-signal touch information will be communicated to the host as a touch down event. If the touch controller does not determine that the touch event intended to wake the electronic device from the low-power mode, the touch status monitor will actively switch between the LPD and LPA scan modes until the touch leaves the touch screen.

As long as the touch event remains on the touch screen and the touch controller does not determine that the touch intended to wake the electronic device from low-power mode, the touch status monitor will actively switch between the LPD and LPA scan modes, but will keep the lock on to prevent the self-signal baseline from updating when the scan modes switches from LPA to LPD. When the scan mode switches from LPA to LPD, the most recent touch information of the touch event determined by the LPA scan will be stored. The most recent information may be used by a host of the electronic device to determine whether the touch event intended to wake the electronic device from the low-power mode. In various embodiments, the host of the electronic device may be the operating system (OS) of the device, or an application processor. The touch status monitor will switch between the two scan modes (LPD and LPA) until the most recent LPA scan detects the touch has left the touch screen.

Once the touch has left the touch screen, the monitor proceeds to box 11o. In box 110, the touch status monitor in low-power mode proceeds to release the lock on the self-signal baseline of the LPD scan mode. The monitor labels the touch event as a touch up event, and the self-signal baseline of the LPD scan mode may be updated. After labeling the touch event as a touch up event, self-signal touch information from the initial LPD scan from the touch down event of the touch event and mutual-sensing touch information from the most recent LPA scan from the touch up event of the touch event may be communicated to the host of the electronic device. In an embodiment, both components of the touch event (the touch down event and the touch up event) may be communicated to the host in a First In First Out (FIFO) method. The touch controller may also determine whether the touch event intended to wake the electronic device from the low-power mode, and communicate that determination to the host, in an embodiment. The host may then determine whether the touch event intended to wake the electronic device from the low-power mode, and will only make a determination based on having the touch down event information and the touch up event information of the touch event, as well as the determination of the intent made by the touch controller.

In an embodiment, the touch controller may determine a touch event intended to wake the electronic device based on the touch type and motion type of the most recent LPA scan without the touch leaving the touch screen. In that case, the mutual-sensing touch information may then be communicated to the host as a touch up event along with the corresponding touch down event for the host to determine whether to wake the electronic device from low-power mode.

It should be understood that for any touch event on the touch screen of an electronic device, the touch status monitor in low-power mode of this disclosure determines a touch down event and a touch up event for the same touch event. The touch down event comprises self-signal baseline touch information, as well as touch presence and a touch down time, which corresponds to the time the touch event was detected by the LPD scan mode on the touch screen. The touch up event comprises the most recent mutual-sensing information of the touch event, which comprises touch coordinates, motion type, touch type, and a touch up time, which corresponds to the time the touch event was detected to have left the touch screen by the most recent LPA scan mode.

Any electronic device that comprises a touch screen controlled by a touch controller may implement the touch status monitor in low-power mode of this disclosure. In an embodiment, an electronic device capable of using the touch status monitor in low-power mode of this disclosure is illustrated in FIG. 2.

FIG. 2 illustrates an electronic device 200 capable of implementing the touch status monitor in low-power mode of this disclosure. The electronic device 200 may be capable of implementing the touch status monitor in low-power mode to monitor touch events on a touch screen 204 after the electronic device 200 enters a low-power mode. The low-power mode may be an operational mode for an electronic device 200 with a touch screen 204 that powers down or puts into a sleep mode non-essential operational features of the electronic device 200, such as turning off a display. The electronic device 200 comprises the touch screen 204, the touch controller 202, the application processor 206, and a memory 208. The electronic device 200 may be any device comprised of the elements mentioned above, such as a smart phone, or a tablet.

The touch screen 204 may be a display device for displaying various applications (for example, phone communication, data transmission, broadcasting, camera and the like) and sensing different touch inputs on the electronic device 200 which may be processed by the touch controller 202. The touch screen 204 acting as a display device provides a user interface that can be configured to adapt to various applications, and may receive at least one touch event through a user's body (for example, fingers including a thumb). The user interface may include a predetermined touch area. The touch screen 204 transmits an electrical signal corresponding to the touch event through the user interface to the touch controller 202. The touch screen 204 may be implemented as any type of touch screen, such as resistive touch screens, capacitive touch screens, surface acoustic wave (SAW) touch screens, infrared touch screens, and optical touch screens. All of which comprise a touch controller that may implement a touch status monitor in low-power mode.

Resistive touch screens comprise two flexible layers coated with a resistive material and separated by a small gap. When the touch screen is pressed, the top layer contacts the bottom layer at the touch point, completing an electrical circuit. The layers comprise polyester or similar materials with a resistive coating. The touch controller applies a small voltage to the layers, and when a touch occurs, the voltage at the point of contact changes. By measuring the voltage change, the touch controller calculates the coordinates of the touch.

Capacitive touch screens utilize the principle of electrostatic capacitance. They comprise a transparent material, often glass, with a grid of electrodes. When a conductive object, like a finger, touches the touch screen, the electrostatic field around the touch screen changes. The change in the electrostatic field alters the capacitance at the touch point. The touch controller measures the capacitance at each touch point and calculates the touch coordinates based on the changes in capacitance. Capacitive touch screens offer multi-touch capabilities and are known for their responsiveness.

SAW touch screens employ ultrasonic waves that are transmitted across the surface of the touch screen. The touch screen comprises two transducers and reflectors positioned along the edges. When the touch screen is touched, the sound waves are absorbed, causing a decrease in the transmitted signal. The touch controller detects this decrease and determines the touch location based on the time it takes for the waves to reach the receiving transducer. SAW touch screens offer excellent optical clarity, high touch accuracy, and can support multiple touch points simultaneously.

Infrared touch screens comprise an array of infrared LED emitters and photodetectors placed around the touch screen's edges. The emitters create an invisible grid of infrared light beams across the touch screen surface. When an object touches the touch screen, the infrared beams are interrupted, and the photodetectors detect the interruption. The touch controller analyzes the interrupted beams and calculates the touch position based on the detected interruptions. Infrared touch screens are durable, reliable, and can work with any object that interrupts the beams, such as a finger or stylus.

Optical imaging touch screens comprise cameras or image sensors positioned behind the touch screen to capture images. When the touch screen is touched, the cameras detect the changes in light patterns caused by the contact. The touch controller analyzes the captured images and identifies the touch position based on the variation in light patterns. Optical imaging touch screens offer high touch accuracy, support multi-touch gestures, and can work with any input object that blocks or alters the light, making them versatile and suitable for various applications.

Any touch events that occur on the touch screen 204 are processed by the touch controller 202. The touch controller 202, when the electronic device 200 is not in the low-power mode, continuously scans the touch screen 204, detects touch events, converts them into digital signals, calculates the touch position, and communicates the information to the electronic device's 200 application processor 206. The application processor 206 then interprets the touch event and triggers the appropriate actions or responses, allowing users to interact with applications, navigate menus, draw, type, or perform various other tasks directly on the touch screen 204.

The touch controller 202, also known as a touch screen controller or touch sensor controller, is an integral component of a touch screen system. The touch controller 202 interprets and translates the touch event detected on the touch screen 204 into digital signals that are processed by the electronic device's 200 application processor 206.

The touch controller 202 acts as an intermediary between the touch screen 204 and the electronic device's 200 application processor 206. The touch controller 202 serves as the interface that converts physical touch interactions into digital data, enabling the electronic device 200 to recognize and respond to user input accurately.

The touch controller 202 continuously scans the touch screen 204 to detect any touch or contact. The touch controller 202 monitors the electrical properties of the touch screen 204, such as changes in capacitance, resistance, or optical properties, depending on the touch screen technology employed (e.g., capacitive, resistive, infrared). The touch controller 202 monitors the electrical properties of the touch screen 204 by implementing a touch status monitor. When a touch event is detected, the touch controller 202 registers the coordinates and other relevant information of the touch event.

The touch controller 202 converts the analog signals received from the touch screen 204 into digital signals that can be processed by the electronic device's 200 application processor 206. The touch controller 202 performs analog-to-digital conversion, sampling the analog touch data at a high frequency and quantizing it into digital values representing the position and characteristics of the touch.

Based on the digital touch data received, the touch controller 202 calculates the precise coordinates of the touch point on the touch screen 204 of the touch event. In embodiments, the touch controller 202 applies algorithms to interpret the position, pressure, size, and other attributes of the touch event.

In addition to basic touch detection, touch controllers incorporate gesture recognition capabilities. The touch controller 202, using gesture recognition algorithms, can identify and interpret gestures such as swipes, pinches, rotations, and multi-finger gestures, providing enhanced functionality and user interaction possibilities.

A touch status monitor, implemented by the touch controller 202, may be a process for continuously monitoring and evaluating touch events on the touch screen's 204 surface. The touch status monitor detects and interprets touch events, tracks gestures, and may provide real-time feedback to the electronic device's 200 operating system or application processor 206. The touch controller 202 of this disclosure is capable of implementing the touch status monitor in low-power mode of this disclosure when the electronic device 200 has entered a low-power mode.

The touch controller 202 communicates with the electronic device's 200 application processor 206, transmitting the processed touch data for further processing. The touch controller 202 may employ standard communication protocols such as I2C (Inter-Integrated Circuit) or SPI (Serial Peripheral Interface) to transfer the touch information to the electronic device's 200 application processor 206.

The touch controller's 202 performance and capabilities significantly impact the touch screen's 204 responsiveness, accuracy, and overall user experience. Advanced touch controllers employ sophisticated algorithms and signal processing techniques to improve touch detection accuracy, reject unintended touches or palm contact, and enhance gesture recognition capabilities.

It should be noted that the touch controller 202 is distinct from the touch screen 204, which physically detects the touch input. The touch controller 202 complements the touch screen 204 by converting the raw touch data into usable digital signals that can be understood by the electronic device 200, facilitating seamless touch interaction and enabling a wide range of touch-based applications and functionalities.

Once the touch event has been processed by the touch controller 202 implementing the touch status monitor in low-power mode of this disclosure, the results of the processing may be communicated to the application processor 206.

The application processor 206 is a key component in electronic devices such as smartphones, tablets, smartwatches, and other portable devices. The application processor 206 comprises a system-on-a-chip (SoC) designed to handle the computational and processing tasks associated with running applications and executing the electronic device's 200 operating system.

The application processor 206 serves as the brain of the electronic device 200, responsible for executing instructions and managing the electronic device's 200 overall performance. The application processor 206 may comprise various components, including one or more central processing units (CPUs), graphics processing units (GPUs), memory controllers, input/output interfaces, multimedia accelerators, and other specialized processing units, in an embodiment.

The primary function of the application processor 206 is to execute software applications, enabling the electronic device 200 to perform tasks such as web browsing, running productivity tools, playing games, streaming media, and running various other software programs. The application processor 206 interprets and executes instructions provided by the operating system and applications, managing tasks, allocating system resources, and coordinating communication between different components of the electronic device 200.

The application processor 206 is typically optimized for power efficiency and performance, striking a balance between processing capabilities and energy consumption to ensure optimal battery life and user experience. The application processor 206 comprises multiple cores, allowing for parallel processing and improved multitasking capabilities, in an embodiment.

In addition to executing software applications, the application processor 206 may also execute other functions such as managing device connectivity (e.g., Wi-Fi, cellular data), processing sensor inputs (e.g., accelerometer, gyroscope), and controlling multimedia processing (e.g., video decoding, image processing). The application processor 206 provides the necessary processing power and computational resources to enable a wide range of functionalities and features in modern electronic devices.

In this disclosure, the application processor 206 receives and performs actions based on the classification of a touch event by the touch status monitor in low-power mode's determination of whether the touch event intended to wake the electronic device 200 from a low-power mode. Based on the result from the touch status monitor in low-power mode, the application processor 206 may determine to wake the electronic device 200.

Overall, the application processor 206 enables the functionality and performance of electronic devices, allowing users to interact with applications and services seamlessly. The application processor's 206 capabilities and efficiency contribute significantly to the user experience and determine the electronic device's 200 overall responsiveness and performance. The application processor 206 executes the instructions or programs that are stored in memory 208.

Memory 208 may be any component or collection of components adapted to store programming, event information, or instructions for execution by the application processor 206. The memory 208 may store the instructions of the touch status monitor in low-power mode for the touch controller 202 to implement. The memory 208 may also store instructions for execution by the touch controller 202. In an embodiment, the memory 208 may also include an associated memory array for storing touch information from the touch down event and touch up event of a touch event. In an embodiment, memory 208 includes a non-transitory computer-readable medium. The non-transitory computer-readable medium includes all types of computer-readable media, including magnetic storage media, optical storage media, flash media, and solid-state storage media.

It should be understood that software can be installed in and sold with electronic device 200. Alternatively, the software can be obtained and loaded into electronic device 200, including obtaining the software through a physical medium or distribution system, including, for example, from a server owned by the software creator or from a server not owned but used by the software creator. The software can be stored on a server for distribution over the Internet, for example.

In embodiments, memory 208 may be a dedicated memory storage for storing instructions or data specific to implementing the touch status monitor in low-power mode and determining whether to wake the electronic device 200 from a low-power mode based on the returned touch classification of a touch event. In other embodiments, memory 208 may refer to existing memory storage to store touch coordinates of a touch event determined by the touch controller 202 implementing the touch status monitor in low-power mode of this disclosure. In other embodiments, memory 208 may have the functionality of both of the previous embodiments.

The touch screen 204 may be further explained by its comprising layers. In an embodiment, the touch screen 204 comprises a touch sensing layer and a display layer, and such an embodiment is illustrated in FIG. 3.

FIG. 3 illustrates the layers of the touch screen 204 of electronic device 200 in an embodiment. The touch screen 204 comprises a touch sensing layer 302 that is combined with a display layer 304. The touch sensing layer 302 detects touch events on the touch screen 204. The display layer 304 displays applications that the electronic device is executing, such as an application output, or other form of a graphical user interface (GUI). In an embodiment, when the electronic device 200 is in a low-power mode, the display layer 304 may be turned off and the touch sensing layer 302 may be monitored for touch events by the touch controller 202 implementing the touch status monitor in low-power mode.

The touch sensing layer 302 comprises touch sensors. Touch sensors used to form a touch sensing layer 302 of a touch screen 204 are typically of the grid type classification. In the grid type of touch sensor, there are two sets of parallel electrodes, commonly referred to as X and Y electrodes, that are arranged orthogonal to each other. A plurality of nodes is defined by intersections of pairs of X and Y electrodes, wherein the number of nodes is a product of the number of X electrodes and the number of Y electrodes. The grid type touch sensor is generally used for a touch screen of a mobile phone, a drawing board, and others.

In an embodiment, the touch sensing layer 302 is a capacitive touch sensing grid of small, transparent electrodes. An X-Y grid is formed by etching two separate, perpendicular layers of conductive material with parallel lines or tracks to form the grid. Everywhere the grid lines overlap, a capacitor is created. The human body is an electrical conductor and when a user touches the touch screen 204 with their finger, the sensor changes the local electric field which reduces the mutual capacitance. The capacitance change at every individual point on the grid is measured to accurately determine the touch location by measuring the voltage in the other axis.

The display layer 304 of the touch screen 204 comprises light emitting electronic devices (e.g., Light Emitting Diodes (LEDs)) that display active applications and other GUIs executing on the electronic device 200. Currently, the most common display technologies used for the display layer 304 integrated with touch sensors to form touch screens are Thin Film Transistor (TFT) Liquid Crystal Displays (LCDs), and Organic Light Emitting Diode (OLED) displays.

An example embodiment of a touch sensing layer 302 of the capacitive type is illustrated in FIG. 4 and is discussed further in the detailed description of FIG. 4.

FIG. 4 illustrates an example touch sensing layer 302 of a touch screen 204. In this embodiment, the touch sensing layer 302 is a capacitive touch sensing layer. The touch sensing layer 302 is comprised of a grid formed from overlapping two separate, perpendicular layers of conductive material with parallel lines or tracks, and everywhere the lines overlap, a capacitor 406 is created. One of the separate parallel line layers of the grid couples to a sense circuit 402, and the other separate parallel line layer couples to a drive circuit 404. Shown in FIG. 4 are the horizontal sense circuit connection lines S1, S2, S3, and S4. Also shown in FIG. 4 are the vertical drive circuit connection lines D1, D2, D3, and D4. In FIG. 4, the grid of capacitors 406 is a four-by-four grid, but it should be understood that this is an illustrative example and the grid of capacitors can be much larger than what is shown. The four-by-four grid of FIG. 4 would correspond to a node count of the touch sensing layer 302 being 16 nodes in total.

Capacitive touch sensors can be classified into self-capacitance and mutual capacitance types. In the measurement of self-capacitance, the measured capacitance is between an electrode beneath a dielectric touch panel and a touch finger, or a stylus, or the like. A touch on the dielectric touch panel increases the effect of the capacitance of the electrode on the charging of a measurement capacitor forming part of the touch integrated circuit (IC) measurement circuit. Thus, the fingers and electrodes can be considered to be plates of a capacitor that form a dielectric with the touch panel. Self-capacitance type touch sensing layers have lower resolution than mutual capacitance types.

In the measurement of mutual capacitance, adjacent pairs of electrodes are arranged below the touch panel and form nominal capacitor plates. A touch control object, which may be an effective dielectric material (e.g., a dry finger or a plastic stylus), or in some cases may be conductive (e.g., a wet finger or a metal stylus), changes the capacitance associated with the electrode pair by displacing the environment (i.e., in most cases air, but possibly water or some other gas or liquid). One of the pair of electrodes is driven by a drive signal (e.g., a pulse train), which is output by the drive circuit 404, and the other electrode of the pair senses the drive signal, which is sensed by the sense circuit 402. The effect of touch is to attenuate or amplify the drive signal received at the sense circuit 402, i.e., to influence the amount of charge collected at the sense electrode. The change in mutual capacitance between the drive and sense electrodes provides a measurable signal. It is noted that in mutual capacitance grid sensors, there is a convention to label the drive electrodes as X electrodes and the sense electrodes as Y electrodes, although this choice is arbitrary. A perhaps clearer, frequently used label is to label drive electrodes as "Tx" for transmission and the sense electrodes as "Rx" similar to telecom symbols, although the label is of course specific to measurements of mutual capacitance.

In an embodiment, the touch sensing layer 304 may comprise self-capacitive type and mutual-capacitive type touch sensors. In an embodiment, the self-signal scan used by the low-power detect (LPD) mode of the touch status monitor in low-power mode may monitor a self-capacitive sensor's capacitance. In an embodiment, the mutual-signal scan used by the low-power active (LPA) mode of the touch status monitor in low-power mode may monitor the capacitance of adjacent layers of mutual-capacitive sensors.

The drive circuit 404 and sense circuit 402 work collaboratively in a capacitive touch screen to sense and interpret touch inputs accurately. The drive circuit 404 is responsible for generating the necessary electrical signals that create an electric field across the drive lines (D1-D4) of the touch sensing layer 302. The drive circuit 404 applies specific voltages or currents to the drive electrodes, which in turn create an electric field. When a user touches the screen, their finger or stylus disrupts this electric field, resulting in a change in capacitance.

The sense circuit 402, comprising sensing electrodes, is designed to detect these capacitance changes. The sense circuit 402 applies a low-level alternating current (AC) signal to the sensing electrodes, or sense lines (S1-S4) which interact with the altered electric field caused by the touch input. The sense circuit 402 monitors the resulting electrical characteristics, such as voltage, frequency, or phase shift. These changes may be analyzed to determine the presence, location, and characteristics of a touch event by the touch status monitor in low-power mode implemented by the touch controller 202.

The drive circuit 404 employed in capacitive touch screens plays a pivotal role in facilitating accurate and reliable touch input detection. The drive circuit 404 is responsible for generating the necessary electrical signals that drive the touch screen electrodes, or drive lines D1-D4. The drive circuit 404 is coupled to the drive lines (D1-D4). By applying specific voltages or currents to the drive lines (D1-D4), such as sine waves or square waves, the drive circuit 404 creates an electric field across the touch sensing layer 302. This electric field interacts with the conductive properties of a user's touch, resulting in a measurable change in capacitance of the capacitor 406 formed between the overlap of a drive line (D1-D4) and a sense line (S1-S4). The drive circuit 404 precisely controls the timing, voltage levels, and waveform characteristics to ensure optimal touch sensitivity and responsiveness. By carefully modulating the signals, the drive circuit 404 enables the touch controller to accurately detect and interpret touch inputs, enabling seamless user interaction and intuitive operation of the capacitive touch screen interface.

A sense circuit 402 is an integral component utilized in capacitive touch screens to accurately measure and interpret the electrical changes caused by user touch. Its primary function is to detect variations in capacitance resulting from the proximity or direct contact of a user's finger or stylus. The sense circuit 402 comprises a series of sensing electrodes, or sense lines (S1-S4), typically located beneath the touch screen surface in the touch sensing layer 302, that are responsible for detecting these capacitance changes. By applying a low-level alternating current (AC) signal to the sensing electrodes (S1-S4), the sense circuit 402 can monitor the resulting electrical characteristics, such as voltage, frequency, or phase shift. This enables the sense circuit 402 to discern the presence and location of touch inputs with high precision. By analyzing the collected data, the sense circuit 402 cooperates with the touch status monitor in low-power mode implemented by the touch controller 202 to accurately interpret the user's gestures and translate them into corresponding commands or actions, enhancing the overall touch screen performance and user experience.

The drive circuit 404 and sense circuit 402 work together in a synchronized manner. The drive circuit 404 generates the necessary signals to create the electric field, while the sense circuit 402 monitors and analyzes the resulting changes in capacitance of the capacitors 406. The touch controller 202, which receives inputs from the sense circuit 402, interprets the collected data and translates it into corresponding information. In the case of this disclosure, the touch controller 202 implements the touch status monitor in low-power mode to conserve power by efficiently monitoring the touch screen 204 for touch events and determining whether the touch events were intended by a user to wake the electronic device 200 from low-power mode. The touch status monitor in low-power mode of this disclosure more effectively filters inadvertent touch events from waking an electronic device 200 from a low-power mode, which reduces the power consumed by the electronic device 200. As a result, the battery life of an electronic device 200 that has a touch controller 202 that implements the touch status monitor in low-power mode of this disclosure may be improved. The touch status monitor in low-power mode of this disclosure may be described further in FIG. 5.

FIG. 5 is a flowchart of the touch status monitor in low-power mode method of this disclosure. The method begins in box 502 where the host issues an entering low-power (LP) mode command. The host enables the touch status monitor in LP mode feature after the electronic device 200 has entered LP mode. The touch status monitor in LP mode feature may be controlled by the touch controller 202, in an embodiment. In an embodiment, the host of the electronic device may be an application processor.

After the host enables the touch status monitor in LP mode feature, the process continues in box 504. In box 504, the touch controller 202 enters a low-power detect (LPD) mode, and a self-signal baseline is updated. When a touch screen 204 operates with the touch status monitor in the LPD mode, only the self-signal scan mode may be used to detect potential touch events. The touch status monitor in LP mode of this disclosure remains in the LPD mode until the LPD mode detects a touch event (i.e., a user's touch) on the touch screen 204.

In box 506, the touch status monitor in LP mode checks for the presence of a touch event on the touch screen 204. The check may be made by measuring a self-signal variation on the touch screen 204. In an embodiment, the self-signal variation may refer to a change in the baseline capacitance level of the touch sensing layer 302 of the touch screen 204. If there is no self-signal variation, the process remains in box 5o6 where the touch status monitor implements the LPD mode to monitor the touch screen until a self-signal variation may be detected.

For the case of measuring a self-signal variation, the process continues to box 508. In box 5o8, the touch controller 202 switches to a low-power active (LPA) mode. Once the touch controller switches to operate in the LPA mode, the touch status monitor result may be set to touch down, and a lock may be implemented to prevent updating the touch status monitor result and to prevent updating the self-signal baseline. If the touch status monitor is already locked, it remains locked. If the touch status monitor result is already set to touch down, it remains in touch down. The LPA mode uses the mutual-sensing capability of the touch screen 204 to detect and monitor touch events and to determine touch information of the touch event. In an embodiment, the mutual-sensing capability of the LPA mode comprises using the mutual-capacitive sensors of a capacitive touch screen like the example illustrated in FIG. 4.

After entering LPA mode, the method continues in box 510. In box 510, the LPA scan mode may be used to check if the touch remains on the touch screen of the electronic device while performing the mutual-sensing scan of the LPA mode. If the touch is not detected to still be present before completing the LPA scan of the touch screen, the touch status monitor in low-power mode proceeds to box 512. In box 512, the touch status monitor result unlocks and changes to touch up. A touch down event comprising the self-signal baseline touch information will be sent to the host, and a touch up event comprising the most recent mutual-sensing scan touch information will be sent to the host. In this case, the LPA scan did not have enough time to complete the scan and the determination of the touch type and motion type of the touch event, so the host will determine the touch event as an invalid attempt to wake the electronic device from the low-power mode. The touch controller switches the scan mode back to LPD scan mode and the self-signal baseline unlocks and updates, which returns the touch status monitor in low-power mode to box 5o6. And in box 5o6, the touch status monitor in low-power mode will resume scanning the touch screen for a self-signal variation, which has outcomes that are already detailed above.

Back in box 510, if the touch remains on the touch screen for a long enough timeframe for the LPA scan to finish, the process continues to box 514. In box 514, the higher resolution LPA scan mode determines the touch type and motion type of the touch using the mutual-sensing capabilities of the touch screen and various algorithms. There are various touch types that the touch event may be classified as, such as tap, double-tap, gestures, multi-finger touch, continuous touch, palm, and others. There are various motion type classifications for a touch event, as well. The various motion types include gestures, pinch, swipe, drag, and others.

Once the touch type and the motion type of the touch event have been determined, the process proceeds to box 516. In box 516, the touch status monitor in low-power mode performs a check to determine if the touch event was an intentional touch. This may be accomplished using a variety of algorithms that determine intent based on the touch type, motion type, and other touch information determined by the LPA scan mode of the touch event. For example, a gesture recognition algorithm may determine if the touch event may be consistent with a swipe to wake the electronic device from the low-power mode.

If the touch event is determined to be an unintentional touch event, such as a continuous touch or multi-finger touch, the process proceeds to box 518. In box 518, the touch status monitor in low-power mode determines if the touch event remained on the touch screen longer than a configurable timeframe. If the touch did not remain for longer than the configurable timeframe, the touch status monitor in low-power mode stays in box 518 until the touch event has remained for longer than the configurable timeframe. If the touch has been present longer than the configurable timeframe, the touch status monitor in low-power mode proceeds back to box 504 where the touch controller enters the LPD scan mode. The self-signal baseline is not updated because the lock is still in place to prevent updating the self-signal baseline.

Back at box 516, if the touch event was determined to be an intentional touch, the process continues to box 520. In box 520, the touch down event and the touch up event are communicated to the application processor, or other host, in a First In First Out (FIFO) method. The touch controller performs checks on the touch information determined by the LPA scan, such as the touch type and motion type, and determines whether to send a wakeup, or interrupt request to the application processor. If the touch controller determines that the touch event intends to wake the electronic device, the touch controller sends the interrupt request, as well as the touch down touch information and the touch up touch information, to the application processor. The application processor determines whether to wake the electronic device from the low-power mode based on all of the touch information and the interrupt request.

To further clarify the touch status monitor in low-power mode, an example touch event may be used to show the different status elements and how they are updated throughout the touch status monitor in low-power mode of this disclosure. These may be detailed below using the table illustrated in FIG. 6.

FIG. 6 is a table that illustrates the status of various touch status monitor elements for an example touch event. There are many status elements of the touch status monitor in low-power mode of this disclosure, which include a touch status, a scan mode, a lock status, a touch status monitor result, and an event label. The table illustrated in FIG. 6 depicts how the status elements are changed based on an example touch event over a timeframe illustrated in the row labeled TOUCH ON TOUCH SCREEN OVER TIME. The table is divided into six different rows, where each row represents a different status element of the touch status monitor in low-power mode (except the second row, which illustrates the example touch event).

The first row represents the touch status (labeled TOUCH STATUS), the third row represents the scan mode (labeled SCAN MODE), the fourth row represents the lock status (labeled LOCK STATUS), the fifth row represents the touch status monitor result (labeled TOUCH STATUS MONITOR), and the sixth row is the event label (labeled EVENT). The columns are divided into various time differentials that collectively sum to a timeframe of t7-t0. The table shows the status elements' returned statuses for the seven timeframes between to and t7.

The touch status is a status element that represents the most recent status of a touch and may change between multiple labels. The labels include a no touch label, a touch down label, a touch motion label, and a touch up label. The label of no touch corresponds to no touch being detected on the touch screen. The label of touch down corresponds to a touch has been detected on a touch screen. The label of touch motion corresponds to a touch, after already being detected on a touch screen, moving on the touch screen. And the label touch up corresponds to detecting that the touch left the touch screen.

The scan mode is a status element that represents the current scan mode being employed by the touch controller implementing the touch status monitor in low-power mode of this disclosure to monitor for touch events on a touch screen. The scan modes comprise the low-power detect (LPD) scan mode, and the low-power active (LPA) scan mode. The LPD scan mode is a self-signal scan mode that may use a self-capacitive sensor, in an embodiment. The LPA scan mode is a mutual-signal scan mode that may use a grid formed from a plurality of mutual-capacitive sensors such as the one illustrated in FIG. 4, in an embodiment.

The lock status is a status element that represents whether the lock to prevent updating the touch status monitor result and the self-signal baseline is locked or unlocked. In the table of FIG. 6, this is indicated by LOCK, or UNLOCK.

The touch status monitor result is a status element that is the returned result of the touch status monitor in low-power mode of this disclosure. The results comprise labeling the touch event as either touch down or touch up. These are represented in the table of FIG. 6 as TOUCH DOWN, or TOUCH UP.

The event label is a status element that is the returned label of events for a touch event. The labels comprise touch down event, or a touch up event and these are the events that are communicated to the application processor by the touch controller. For a touch event, the touch controller implementing the touch status monitor in low-power mode of this disclosure may communicate a touch down event and a touch up event. The touch down event comprises the timeframe in which the touch was detected to contact the touch screen and touch information from the most recent LPA scan mode. The touch up event comprises the timeframe in which the touch left the touch screen and touch information of the touch from the most recent LPA scan mode.

A touch down event is a label for a touch event over a timeframe where the scan mode switches from LPD scan mode to LPA scan mode, and the lock is initiated. A touch up event is a label for a touch event over a timeframe where the scan mode switches from LPA scan mode to LPD scan mode, the touch is detected to have left the touch screen, and the lock is released. The event label corresponds to the timeframes that the touch event may be communicated to the application processor as. For example, if the event label is touch down event for a timeframe, the touch information of that timeframe may be communicated to the application processor as the touch down portion of a touch event. These are represented in the table of FIG. 6 as TOUCH DOWN EVENT, or TOUCH UP EVENT.

The example touch event illustrated in the table of FIG. 6 starts at time to and covers a timeframe of t1-t0. There is no finger contacting the arrow of the TOUCH ON TOUCH SCREEN OVER TIME row in this timeframe. As a result, the touch status is NO TOUCH, the scan mode is in the initial scan mode in low-power mode of LPD waiting for a touch event to occur, the lock status is UNLOCK, there is no touch status monitor result, and the event is labeled TOUCH DOWN EVENT. The event is labeled TOUCH DOWN EVENT because this status element is intended to give a timeframe where an event occurred over. The next timeframe is t2-t1 and there is a touch that occurs in that timeframe, so the event label is set for TOUCH DOWN EVENT for the past timeframe (where the touch may have been detected to cause the switch from LPD to LPA of the scan mode) and the timeframe the touch is detected with LPA in.

The next timeframe starts at t1 and covers a timeframe of t2-t1. There is a touch on the touch screen illustrated on the arrow of TOUCH ON TOUCH SCREEN OVER TIME row in this timeframe. As a result, the touch status changes to TOUCH DOWN, the scan mode switches from LPD to LPA (and the self-signal baseline of LPD will not be updated until the lock lifts), the lock status changes to LOCK because of the initiated lock, the touch status monitor result is TOUCH DOWN and remains that until the lock lifts, and the event label is TOUCH DOWN EVENT for reasons explained above. The event label is TOUCH DOWN EVENT for the timeframe t2-t0, and the touch information from the LPA scan mode in that timeframe is communicated to the application processor as the touch down event of the illustrated touch event.

The next timeframe starts at t2 and covers a timeframe of t3-t2. In this timeframe, the touch on the touch screen moves while maintaining contact with the touch screen. As a result, the touch status changes to TOUCH MOTION, the scan mode switches from LPA to LPD and does not update the self-signal baseline of LPD because the lock is on, the lock status remains LOCK, the touch status monitor result remains TOUCH DOWN, and there is no label for the event label because a touch down or touch up event has not occurred within this timeframe.

The next timeframe starts at t3 and covers a timeframe of t4-t3. In this timeframe, the touch on the touch screen moves while maintaining contact with the touch screen. As a result, the touch status remains TOUCH MOTION, the scan mode switches from LPD to LPA because a touch is detected on the touch screen, the lock status remains LOCK, the touch status monitor result remains TOUCH DOWN, and there is no label for the event label because a touch down or touch up event has not occurred within this timeframe.

The next timeframe starts at t4 and covers a timeframe of t5-t4. In this timeframe, the touch on the touch screen moves while maintaining contact with the touch screen. As a result, the touch status remains TOUCH MOTION, the scan mode switches from LPA to LPD because the touch remained on the touch screen longer than the configurable timeframe of the LPA scan mode and the self-signal baseline of LPD does not update because the lock is on, the lock status remains LOCK, the touch status monitor result remains TOUCH DOWN, and there is no label for the event label because a touch down or touch up event has not occurred within this timeframe.

The next timeframe starts at t5 and covers a timeframe of t6-t5. In this timeframe, the touch on the touch screen moves while maintaining contact with the touch screen. As a result, the touch status remains TOUCH MOTION, the scan mode switches from LPD to LPA because a touch is detected on the touch screen, the lock status remains LOCK, the touch status monitor result remains TOUCH DOWN, and the event label switches to TOUCH UP EVENT because the touch is detected to leave the surface of the touch screen in the next timeframe.

The next timeframe starts at t6 and covers a timeframe of t7-t6. In this timeframe, the touch leaves the surface of the touch screen, which is illustrated in the TOUCH ON TOUCH SCREEN OVER TIME row by the finger not contacting the arrow. Because there is no touch on the touch screen, the lock lifts. As a result, the touch status switches to TOUCH UP, the scan mode switches to LPD scan mode and updates the self-signal baseline because the lock has been lifted, the lock status switches to UNLOCK because the lock has been lifted, the touch status monitor result reports TOUCH UP, and the event label remains TOUCH UP EVENT because the touch left the touch screen in the timeframe t7-t5. The touch information from the LPA scan mode in the timeframe t7-t5 is communicated to the application processor as the touch up event of the illustrated touch event.

Previous touch status monitors in low-power mode would report multiple touch events, each having a touch down event and a touch up event (some having multiple touch up events for a single touch down event), to the application processor for the type of touch event illustrated in FIG. 6. Certain touch classifications would cause that behavior and inadvertently wake the electronic device from low-power mode because the self-signal baseline had no lock. As a result, the self-signal baseline would repeatedly update every time the scan mode switched between the LPA to LPD, which would cause the removal of a touch event to be detected as a variation from the self-signal baseline. And because there was a detected variation from the self-signal baseline, a new touch event would be reported to the application processor to potentially wake the electronic device from low-power mode. The touch status monitor in low-power mode of this disclosure addresses this issue. The ability of the touch status monitor in low-power mode of this disclosure to properly handle those types of touch events may be illustrated by the table of FIG. 6, where only one touch down event and one touch up event for the touch event were determined.

Because the touch event illustrated in the table of FIG. 6 remained on the touch screen for multiple timeframes that the scan mode was operating in LPA, the touch event may be consistent with a touch type classification called continuous touch. A continuous touch type of touch event may be described in further detail in the description of FIG. 7 below.

FIG. 7 is an illustration of an example touch event, called continuous touch, which may occur on an electronic device 200. In a continuous touch, a touch event occurs on the touch screen 204 of the electronic device 200 and remains on the touch screen 204 longer than a configurable timeframe. The touch event does not necessarily have to remain in the same location to be classified as a continuous touch. In an embodiment, the touch event may remain stationary, but present on the touch screen 204 longer than the configurable timeframe. In other embodiments, the touch event may start in one location on the touch screen 204 and move to a different location on the touch screen 204 while maintaining contact longer than the configurable timeframe.

Illustrated in FIG. 7 is a touch event with an initial position 702. The touch event maintains contact with the touch screen 204 of the electronic device 200 and follows the arrow through a middle position 704, and continues along the right arrow moving to an end position 706. The touch event maintains contact with the touch screen 204 while moving through the three positions longer than the configurable timeframe. As a result, the touch event illustrated in FIG. 7 may be classified as continuous touch.

A continuous touch is a type of touch event that caused previous touch status monitors to mistakenly bring an electronic device 200 out of low-power mode. The touch status monitor in LP mode of this disclosure can accurately detect continuous touch type touch events and as a result, avoid inadvertently bringing the electronic device 200 out of low-power mode.

FIG. 8 is an illustration of an example touch event, called multi-finger touch, that may occur on an electronic device 200. When multiple regions of the touch screen 204 sense touch simultaneously, the associated touch event may be classified as a multi-finger touch. The touch event illustrated in FIG. 8 has three touch areas illustrated. These are first finger 802, second finger 804, and third finger 806. As a result of the three touch areas (802, 804, 806) being present at the same time, the touch event illustrated in FIG. 8 may be classified as a multi-finger touch.

A multi-finger touch is another type of touch event that caused previous touch status monitors to mistakenly bring an electronic device 200 out of low-power mode. The touch status monitor in LP mode of this disclosure can accurately detect multi-finger touch type touch events and as a result, avoid inadvertently bringing the electronic device 200 out of low-power mode.

Example embodiments of the invention are described below. Other embodiments can also be understood from the entirety of the specification as well as the claims filed herein.

Example 1. A touch status monitor method includes detecting a touch on a touch screen when operating in a low-power detect scan mode. The method further includes, in response to detecting the touch, switching from the low-power detect scan mode to a low-power active scan mode and labeling the current event as a touch down event. The method further includes, in response to labeling the current event as the touch down event, applying a lock to prevent updating a baseline when entering the low-power detect scan mode. And the method further includes, in response to detecting that the touch has left the touch screen, releasing the lock, labeling the current event as a touch up event, switching from the low-power active scan mode to the low-power detect scan mode, and updating the baseline.

Example 2. The method of example 1, where operating in the low-power detect scan mode includes performing a self-sensing scan, and switching from the low-power detect scan mode to the low-power active scan mode includes switching from the self-sensing scan to a mutual-sensing scan.

Example 3. The method of one of examples 1 or 2, where labeling the current event as the touch down event includes changing a touch status monitor result to the touch down event.

Example 4. The method of one of examples 1 to 3, where applying the lock includes preventing the baseline from updating, and preventing the touch status monitor result changing from touch down event.

Example 5. The method of one of examples 1 to 4, where updating the baseline includes performing a self-sensing scan on the touch screen, performing a touch recognition process based on the self-sensing scan, and updating touch values in an associated memory array based on the touch recognition process.

Example 6. The method of one of examples 1 to 5, where preventing the baseline from updating includes performing the self-sensing scan on the touch screen, performing the touch recognition process, and not updating the touch values in the associated memory array.

Example 7. The method of one of examples 1 to 6, further including, in response to detecting that the touch has not left the touch screen, switching between the low-power active scan mode and low-power detect scan mode while maintaining the lock until the touch leaves the touch screen.

Example 8. The method of one of examples 1 to 7, further including, in response to detecting the touch on the touch screen when operating in low-power detect scan mode, determining a first set of touch information including a touch down event number, and a first touch time.

Example 9. The method of one of examples 1 to 8 further includes, in response to switching from the low-power detect scan mode to the low-power active scan mode, determining a second set of touch information including a touch up event number, a touch type, a motion type, a touch coordinate, and a second touch time, and where the touch up event number matches the touch down event number for the touch. And further includes determining whether the touch was a valid attempt to wake the touch screen from a low-power mode using the second set of touch information.

Example 10. The method of one of examples 1 to 9, further including, in response to detecting that the touch has left the touch screen and that the touch was a valid attempt to wake the touch screen from a low-power mode, transmitting the first set of touch information and the second set of touch information to a host of an electronic device to generate a wake signal to wake the touch screen from the low-power mode.

Example 11. An electronic device includes a touch screen, an application processor, and a touch controller coupled to a memory storing instructions to be executed in the touch controller. The instructions when executed cause the touch controller to detect a touch on the touch screen when operating in a low-power detect scan mode, and in response to detecting the touch, switch from the low-power detect scan mode to a low-power active scan mode and label the current event as a touch down event. The instructions when executed cause the touch controller to, in response to labeling the current event as the touch down event, apply a lock to prevent updating a baseline when entering the low-power detect scan mode, and in response to detecting that the touch has left the touch screen, release the lock, label the current event as a touch up event, switch from the low-power active scan mode to the low-power detect scan mode, and update the baseline.

Example 12. The device of example 11, where to operate in the low-power detect scan mode, the touch controller is programmed to perform a self-sensing scan, and to switch from the low-power detect scan mode to the low-power active scan mode, the touch controller is programmed to switch from the self-sensing scan to a mutual-sensing scan.

Example 13. The device of one of examples 11 or 12, where to label the current event as the touch down event, the touch controller is programmed to change a touch status monitor result to the touch down event.

Example 14. The device of one of examples 11 to 13, where to apply the lock, the touch controller is programmed to prevent the baseline from updating, and prevent the touch status monitor result changing from touch down event.

Example 15. The device of one of examples 11 to 14, where to update the baseline, the touch controller is programmed to perform a self-sensing scan on the touch screen, to perform a touch recognition process, and to update values in an associated memory array in the memory based on the touch recognition process.

Example 16. The device of one of examples 11 to 15, where to prevent the baseline from updating, the touch controller is programmed to perform the self-sensing scan on the touch screen, to perform the touch recognition process, and to not update the values in the associated memory array in the memory.

Example 17. The device of one of examples 11 to 16, where the touch controller is programmed to further include, in response to detecting that the touch has not left the touch screen, switch between the low-power active scan mode and low-power detect scan mode while maintaining the lock until the touch leaves the touch screen.

Example 18. The device of one of examples 11 to 17, where the touch controller is programmed to further include, in response to detecting the touch on the touch screen when operating in low-power detect scan mode, determine a first set of touch information including a touch down event number, and a first touch time.

Example 19. The device of one of examples 11 to 18, where the touch controller is programmed to further include, in response to switching from the low-power detect scan mode to the low-power active scan mode, determine a second set of touch information including a touch up event number, a touch type, a motion type, a touch coordinate, and a second touch time, and where the touch up event number matches the touch down event number for the touch. The touch controller is programmed to further include determining whether the touch was a valid attempt to wake the touch screen from a low-power mode using the second set of touch information.

Example 20. The device of one of examples 11 to 19, where the touch controller is programmed to further include, in response to detecting that the touch has left the touch screen and that the touch was a valid attempt to wake the touch screen from a low-power mode, transmit the first set of touch information and the second set of touch information to the application processor of the electronic device to generate a wake signal to wake the touch screen from the low-power mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A touch status monitor method comprising:
   detecting a touch on a touch screen when operating in a low-power detect scan mode;
   in response to detecting the touch, switching from the low-power detect scan mode to a low-power active scan mode and labeling a current event of the detected touch as a touch down event;
   in response to labeling the current event as the touch down event, applying a lock to prevent updating a baseline when entering the low-power detect scan mode; and
   in response to detecting that the touch has left the touch screen, releasing the lock, labeling the current event as a touch up event, switching from the low-power active scan mode to the low-power detect scan mode, and updating the baseline.

2. A touch status monitor method comprising:
  detecting a touch on a touch screen when operating in a low-power detect scan mode;
  in response to detecting the touch, switching from the low-power detect scan mode to a low-power active scan mode and labeling a current event of the detected touch as a touch down event;
  in response to labeling the current event as the touch down event, applying a lock to prevent updating a baseline when entering the low-power detect scan mode;
  in response to detecting that the touch has left the touch screen, releasing the lock, labeling the current event as a touch up event, switching from the low-power active scan mode to the low-power detect scan mode, and updating the baseline; and
  in response to detecting that the touch has not left the touch screen, switching between the low-power active scan mode and low-power detect scan mode while maintaining the lock until the touch leaves the touch screen.

3. The method of claim 2, further comprising, in response to detecting the touch on the touch screen when operating in low-power detect scan mode, determining a first set of touch information comprising a touch down event number, and a first touch time.

4. The method of claim 3, further comprising:
  in response to switching from the low-power detect scan mode to the low-power active scan mode, determining a second set of touch information comprising a touch up event number, a touch type, a motion type, a touch coordinate, and a second touch time, and wherein the touch up event number matches the touch down event number for the touch; and
  determining whether the touch was a valid attempt to wake the touch screen from a low-power mode using the second set of touch information.

5. The method of claim 4, further comprising, in response to detecting that the touch has left the touch screen and that the touch was a valid attempt to wake the touch screen from a low-power mode, transmitting the first set of touch information and the second set of touch information to a host of an electronic device to generate a wake signal to wake the touch screen from the low-power mode.

6. The method of claim 1, wherein applying the lock comprises preventing the baseline from updating, and preventing a touch status monitor result changing from the touch down event.

7. The method of claim 6, wherein preventing the baseline from updating comprises performing a self-sensing scan on the touch screen, performing ae touch recognition process based on the self-sensing scan, and not updating the touch values in an associated memory array.

8. The method of claim 1, wherein operating in the low-power detect scan mode comprises performing a self-sensing scan, and switching from the low-power detect scan mode to the low-power active scan mode comprises switching from the self-sensing scan to a mutual-sensing scan.

9. The method of claim 1, wherein labeling the current event as the touch down event comprises changing a touch status monitor result to the touch down event.

10. The method of claim 1, wherein updating the baseline comprises performing a self-sensing scan on the touch screen, performing a touch recognition process based on the self-sensing scan, and updating touch values in an associated memory array based on the touch recognition process.

11. An electronic device comprising:
  a touch screen;
  an application processor;
  a touch controller coupled to a memory storing instructions to be executed in the touch controller, the instructions when executed cause the touch controller to:
    detect a touch on the touch screen when operating in a low-power detect scan mode;
    in response to detecting the touch, switch from the low-power detect scan mode to a low-power active scan mode and label a current event of the detected touch as a touch down event;
    in response to labeling the current event as the touch down event, apply a lock to prevent updating a baseline when entering the low-power detect scan mode; and
    in response to detecting that the touch has left the touch screen, release the lock, label the current event as a touch up event, switch from the low-power active scan mode to the low-power detect scan mode, and update the baseline.

12. The device of claim 11, wherein the touch controller is programmed to further include, in response to detecting that the touch has not left the touch screen, switch between the low-power active scan mode and low-power detect scan mode while maintaining the lock until the touch leaves the touch screen.

13. The device of claim 12, wherein the touch controller is programmed to further include, in response to detecting the touch on the touch screen when operating in low-power detect scan mode, determine a first set of touch information comprising a touch down event number, and a first touch time.

14. The device of claim 13, wherein the touch controller is programmed to further include:
  in response to switching from the low-power detect scan mode to the low-power active scan mode, determine a second set of touch information comprising a touch up event number, a touch type, a motion type, a touch coordinate, and a second touch time, and wherein the touch up event number matches the touch down event number for the touch; and
  determine whether the touch was a valid attempt to wake the touch screen from a low-power mode using the second set of touch information.

15. The device of claim 14, wherein the touch controller is programmed to further include, in response to detecting that the touch has left the touch screen and that the touch was a valid attempt to wake the touch screen from a low-power mode, transmit the first set of touch information and the second set of touch information to the application processor of the electronic device to generate a wake signal to wake the touch screen from the low-power mode.

16. The device of claim 11, wherein to apply the lock, the touch controller is programmed to prevent the baseline from updating, and prevent a touch status monitor result changing from the touch down event.

17. The device of claim 16, wherein to prevent the baseline from updating, the touch controller is programmed to perform a self-sensing scan on the touch screen, to perform a touch recognition process based on the self-sensing scan, and to not update the values in an associated memory array in the memory.

18. The device of claim 11, wherein to operate in the low-power detect scan mode, the touch controller is programmed to perform a self-sensing scan, and to switch from the low-power detect scan mode to the low-power active scan mode, the touch controller is programmed to switch from the self-sensing scan to a mutual-sensing scan.

19. The device of claim 11, wherein to label the current event as the touch down event, the touch controller is programmed to change a touch status monitor result to the touch down event.

20. The device of claim 11, wherein to update the baseline, the touch controller is programmed to perform a self-sensing scan on the touch screen, to perform a touch recognition process, and to update values in an associated memory array in the memory based on the touch recognition process.

* * * * *

UNITED STATES PATENT AND TRADEMARK OFFICE
CERTIFICATE OF CORRECTION

| | | |
|---|---|---|
| PATENT NO. | : 12,086,358 B1 | Page 1 of 1 |
| APPLICATION NO. | : 18/500782 | |
| DATED | : September 10, 2024 | |
| INVENTOR(S) | : Ma et al. | |

It is certified that error appears in the above-identified patent and that said Letters Patent is hereby corrected as shown below:

In the Claims

In Column 20, in Claim 1, Line 62, delete "touchas" and insert -- touch as --.

In Column 21, in Claim 7, Line 54, after "performing" delete "ae" and insert -- a --.

Signed and Sealed this
Twenty-second Day of October, 2024

Katherine Kelly Vidal
*Director of the United States Patent and Trademark Office*